US006029448A

United States Patent [19]

[11] Patent Number: 6,029,448

[45] Date of Patent: Feb. 29, 2000

Hobson

[54] LOW NOISE HYDRAULIC POWER UNIT FOR AN AUTO-HOIST LIFT

[75] Inventor: Nicholas M. Hobson, Essex, United Kingdom

[73] Assignee: Fenner Fluid Power, Rockford, Ill.

[21] Appl. No.: 08/986,736

[22] Filed: Dec. 8, 1997

[51] Int. Cl.[7] ...................................................... F16D 31/02

[52] U.S. Cl. ................................ 60/468; 60/494; 60/477; 417/42; 417/371

[58] Field of Search .............................. 60/422, 432, 468, 60/469, 477, 494; 417/410.4, 423.3, 42, 371

[56] References Cited

U.S. PATENT DOCUMENTS

| | | | |
|---|---|---|---|
| 3,667,870 | 6/1972 | Yoshida et al. | 417/371 X |
| 3,764,233 | 10/1973 | Strickland | 417/371 X |
| 5,253,982 | 10/1993 | Niemiec et al. | 417/371 X |
| 5,286,171 | 2/1994 | Murota et al. | 417/42 X |
| 5,605,448 | 2/1997 | Martin, Sr. | 417/410.4 X |
| 5,687,567 | 11/1997 | Hansson et al. | 60/468 X |
| 5,700,138 | 12/1997 | Bevington | 417/371 X |
| 5,736,823 | 4/1998 | Nordby et al. | 417/42 X |
| 5,778,671 | 7/1998 | Bloomquist et al. | 417/371 X |

*Primary Examiner*—Hoang Nguyen
*Attorney, Agent, or Firm*—Leydig, Voit & Mayer

[57] ABSTRACT

A hydraulic power unit for an auto-hoist lift having improved noise characteristics and a more compact design. A motor and pump driving the power unit are located inside a hydraulic fluid reservoir to thereby reduce the amount of noise reaching the immediate vicinity of the power unit. The motor and pump are submerged in the hydraulic fluid to advantageously utilize the hydraulic fluid to cool the motor. The power unit may further incorporate a delay valve for reducing the start-up torque load on the motor, thereby allowing the motor to be sized for normal operating requirements rather than oversized for start-up requirements.

9 Claims, 4 Drawing Sheets

LOW NOISE HYDRAULIC POWER UNIT FOR AN AUTO-HOIST LIFT

FIELD OF THE INVENTION

The present invention generally relates to hydraulic power units, and more particularly relates to hydraulic power units used to operate auto-hoist lifts.

BACKGROUND OF THE INVENTION

Lifts are typically used to raise and lower heavy loads. Hydraulic lifts use hydraulic power units to control the pressure level of hydraulic fluid delivered to the lift and, accordingly, to raise or lower the lift. As used herein, hydraulic fluid means any fluid which can be used in a hydraulic system, including oil, emulsions, water, and synthetic fluids. Such power units typically have a motor attached to a pump which pulls the hydraulic fluid from a reservoir and delivers it to the lift. As hydraulic fluid is delivered to the lift, the fluid pressure increases until it overcomes the load on the lift, thereby raising the lift. To lower the lift, the motor is stopped and a return valve actuated which returns hydraulic fluid from the lift back into the reservoir.

Auto-hoist lifts typically have lifting members which engage the load to be raised and lowered and are controlled by a hydraulic power unit. The lifting members are attached to hydraulic cylinders which, in turn, are hydraulically connected to the power unit. The pressure of the hydraulic fluid operates the cylinders and therefore controls the elevation of the lifting members. The power unit has a pump which may pressurize the hydraulic fluid, thereby raising the lifting members. Alternatively, the fluid pressure may be relieved, thereby lowering the lifting members.

Unfortunately, conventional power units used to control hydraulic hoists are loud, bulky, and unduly load the motor. In a typical power unit, the motor and pump are located directly above and adjacent to the reservoir. The operation of the power unit results in considerable vibration of the pump and motor, which is communicated to the direct vicinity of the power unit in the form of noise. Since hydraulic lifts and their power units are commonly installed indoors, motor noise has been the source of substantial annoyance and dissatisfaction.

In addition, motors used in conventional hydraulic power units are exposed to the environment, and therefore must rely on air in the vicinity of the power unit to cool the motor. These motors typically do not incorporate fans to blow air through the motor and therefore the interior of the motor is susceptible to overheating.

Furthermore, the motor of a conventional hydraulic power unit must be oversized to meet torque requirements during start-up. When first energized under a given load, a motor uses auxiliary windings to obtain a normal operating speed. As a result, the motor is less efficient and must be oversized to handle the given load during start-up. Once the normal operating speed is reached, the auxiliary windings are no longer used and motor efficiency increases. Accordingly, the motors of conventional hydraulic power units must be oversized to meet the torque requirement for start-up rather than the torque load experienced at normal operating speed.

Conventional hydraulic power units also use motors having mechanical means for switching off the auxiliary windings. The mechanical means typically employs a centrifugal switch which uses a spring to cut off the auxiliary windings. Spring displacement, however, is affected by the medium which surrounds the spring. For example, if the spring is submerged in hydraulic fluid, the loading and displacement of the spring while the motor is operating are different than when the spring is surrounded by air. Accordingly, the mechanical means used by conventional power units to control the auxiliary windings is often affected by the medium surrounding the motor.

SUMMARY OF THE INVENTION

A general aim of the present invention is to provide a hydraulic power unit for an auto-hoist lift with improved sound characteristics.

It is a related object of the present invention to provide a hydraulic power unit with improved motor cooling.

Another object of the present invention is to provide a hydraulic power unit which is more compact in size yet maintains a given lifting capacity.

Yet another object of the present invention is to provide a hydraulic power unit which more reliably controls the use of auxiliary windings in the motor when the motor is submerged in hydraulic fluid.

In accordance with these and other objects of the present invention, a power unit for an auto-hoist lift is provided having a motor and pump submerged in a hydraulic fluid reservoir, wherein the amount of noise generated by the motor and pump reaching the immediate vicinity of the power unit is reduced. The power unit of the present invention encloses the motor and pump in a reservoir to thereby reduce the acoustic output of the power unit. In addition, the hydraulic fluid is pulled through the motor to cool the motor.

In another embodiment, it is a feature of the present invention to provide a power unit which incorporates a load delay circuit to thereby reduce the load on the motor during start-up. The load delay may be hydraulically or electronically controlled so that the pump reaches a predetermined speed before encountering a full load. As a result, the required starting torque for the lift is reduced, thereby eliminating the need for an oversized motor. In certain embodiments, the present invention incorporates a solid state switch for controlling the use of auxiliary windings in the motor, thereby improving the control of the windings.

These and other objects and advantages of the invention will become more apparent from the following detailed description when taken in conjunction with the accompanying drawings.

Figure 1:
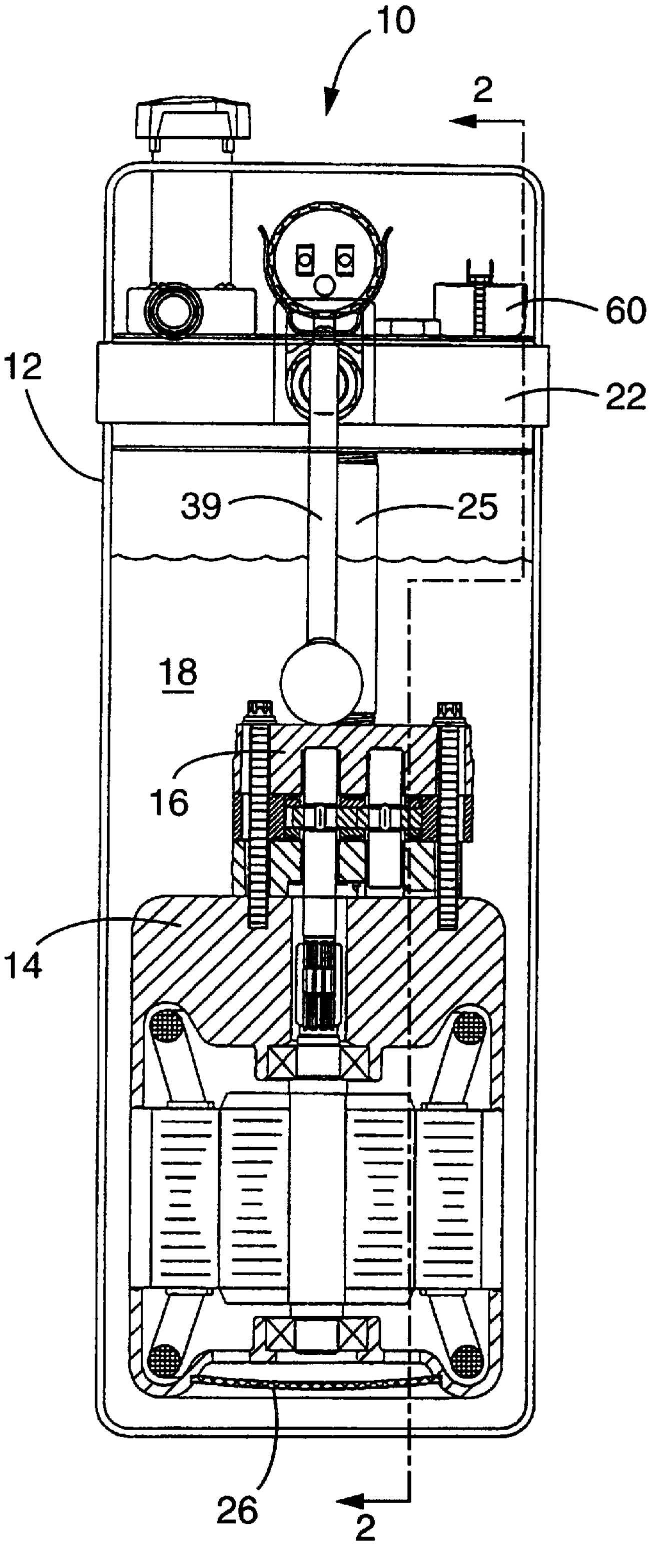
FIG. 1 is a sectional view of a hydraulic power unit in accordance with the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

Figure 3:
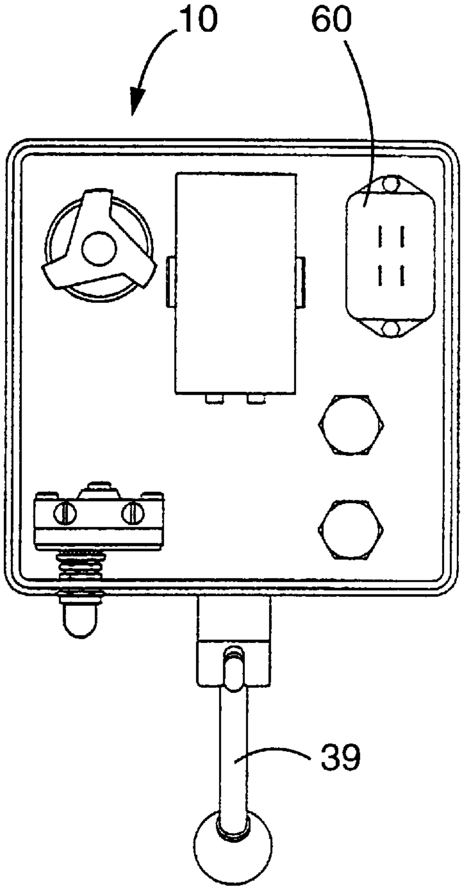
FIG. 3 is a top view of the hydraulic power unit of FIG. 1.
Figure 2:
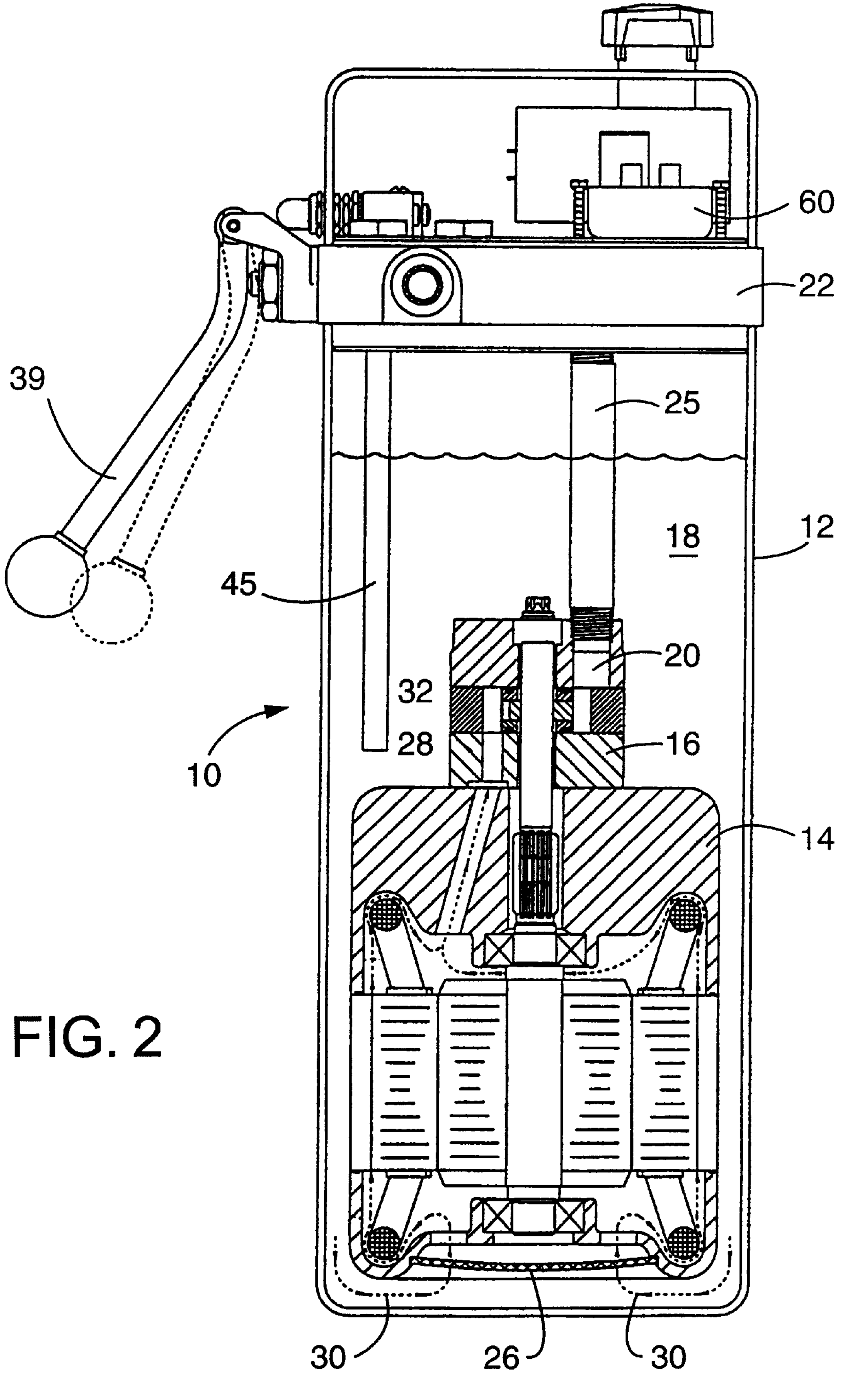
FIG. 2 is a sectional view of a hydraulic power unit taken along line 2—2 of FIG. 1.

Referring now to the drawings, and in particular to FIGS. 1–3, a hydraulic power unit 10 in accordance with the present invention is shown in cross-section. As shown, hydraulic power unit 10 includes reservoir 12 housing a motor 14 and pump 16. The power unit 10 is connected to a lift, such as an auto-hoist lift 100, and controls the pressure of hydraulic fluid 18 delivered to cylinders 101 which raise and lower lifting members 101 of the lift.

In greater detail, the reservoir 12 provides a hollow vessel for holding hydraulic fluid 18 to be delivered to the cylinders and houses the motor 14 and pump 16. The reservoir 12 is formed into a hollow cylinder or elongate rectangular box. A suitable material for forming the reservoir is high-density polyethylene (HDPE), however other materials known in the art may also be used. The volume capacity of the reservoir 12 is sized so that it holds an adequate amount of hydraulic fluid while housing the motor 14 and pump 16. The reservoir 12 is closed at the bottom but has an open top sealed by a manifold block 22, as described in greater detail below.

The motor 14 is provided for driving the pump 16. As best shown in FIG. 1, the pump 16 is mounted directly on the motor 14. The motor 14 runs on alternating current and is designed to be submerged in the hydraulic fluid. The pump 16 may be of any type suitable for hydraulic applications, including, but not limited to gear, vane, or piston type pumps.

According to significant aspects of the present invention, it will be appreciated that the location of the motor 14 and pump 16 inside the reservoir 12 reduces the acoustic output of the hydraulic power unit 10. As shown in FIG. 1, the pump 16 is mounted directly on the motor 14. The pump and motor are mounted inside the reservoir so that much of the noise generated by these members is retained inside the reservoir 12 which acts as a noise barrier.

In accordance with additional aspects of the present invention, the motor 14 and pump 16 are mounted near the bottom of the reservoir 12 so that the motor and pump remain submerged in the hydraulic fluid. As noted above, the volume capacity of the reservoir 12 is sized to accommodate the motor 14 and pump 16. Hydraulic fluid deposited in the reservoir 12 encompasses the motor and pump. When fluid 18 is needed at the lift, the pump 16 operates to pull the fluid through the motor 14, thereby cooling the motor. Furthermore, the hydraulic fluid 18 acts to further reduce noise generated by the motor 14 and pump 16.

In operation, the pump 16 pulls hydraulic fluid 18 through the motor 14 and delivers it to the manifold block 22. As best shown in FIG. 1, the hydraulic fluid is pulled from the bottom of the reservoir 12 through a motor screen 26 and up to motor exit passage 28, as indicated by the arrows indicated by reference number 30 in FIG. 3. The hydraulic fluid is then pumped through the pump inlet 32 and discharges at the pump outlet 20.

A manifold block 22 carries a hydraulic circuit 23 (FIG. 5) for controlling the pressure level of the hydraulic fluid 18 delivered to the lift. As best shown in FIG. 1, the manifold block 22 is located above the pump 16 and seals the open end of the reservoir 12. The hydraulic circuit 23 comprises a plurality of valves which control the delivery of hydraulic fluid 18 to the lift.

Figure 4:
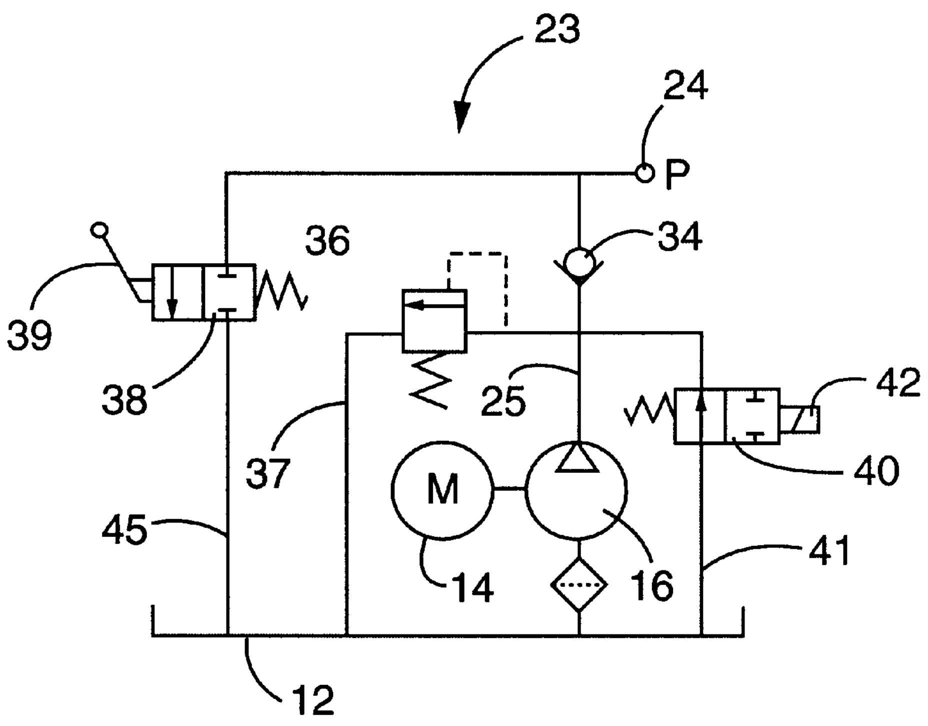
FIG. 4 is a schematic showing a hydraulic load delay circuit.

According to the embodiment illustrated schematically in FIG. 4, the motor 14 and pump 16 are connected to the manifold block 22 by inlet line 25. A check valve 34 is located on a branch of the inlet line 25 for allowing hydraulic fluid delivered by the pump to flow in a direction towards a pressure port 24 but prohibits hydraulic fluid flow in the reverse direction.

A safety valve 36 is also located on the inlet line 25 and is piped in parallel with the check valve 34. The safety valve 36 prevents the build-up of excessively high levels of hydraulic fluid pressure. The safety valve 36 is normally closed, but will open to allow hydraulic fluid to flow through a safety line 37 which leads hydraulic fluid back into the reservoir 12 when the hydraulic fluid pressure at the inlet line 25 reaches a pre-determined upper limit.

A return valve 38 is piped into the hydraulic circuit after the check valve 34 for returning hydraulic fluid to the reservoir 12 from the lift. The return valve 38 is normally closed but will open when manually actuated by a handle 39. When opened, hydraulic fluid from the lift will flow past the return valve 38 and through a return line 45 to return to the reservoir, thereby lowering the lift. The manifold described to this point may therefore control the raising or lowering of the lift while avoiding excessively high hydraulic fluid pressure.

In accordance with certain aspects of the present invention, the hydraulic circuit 23 further incorporates a delay valve 40 for reducing the initial torque load on the motor 14. By decreasing the start-up torque load, the motor 14 may be sized according to normal operating requirements and need not be oversized to meet a higher start-up load. Accordingly, a smaller motor may be used for a given load on the lift.

As illustrated in FIG. 4, the delay valve 40 is located on the inlet line 25 in parallel with the check valve 34 and safety valve 36. The delay valve 40 is normally open and returns hydraulic fluid to the reservoir 12 through a delay line 41. The delay valve 40 remains open for a period of time before it closes, thereby allowing hydraulic fluid to be delivered to the pressure port.

Figure 5:
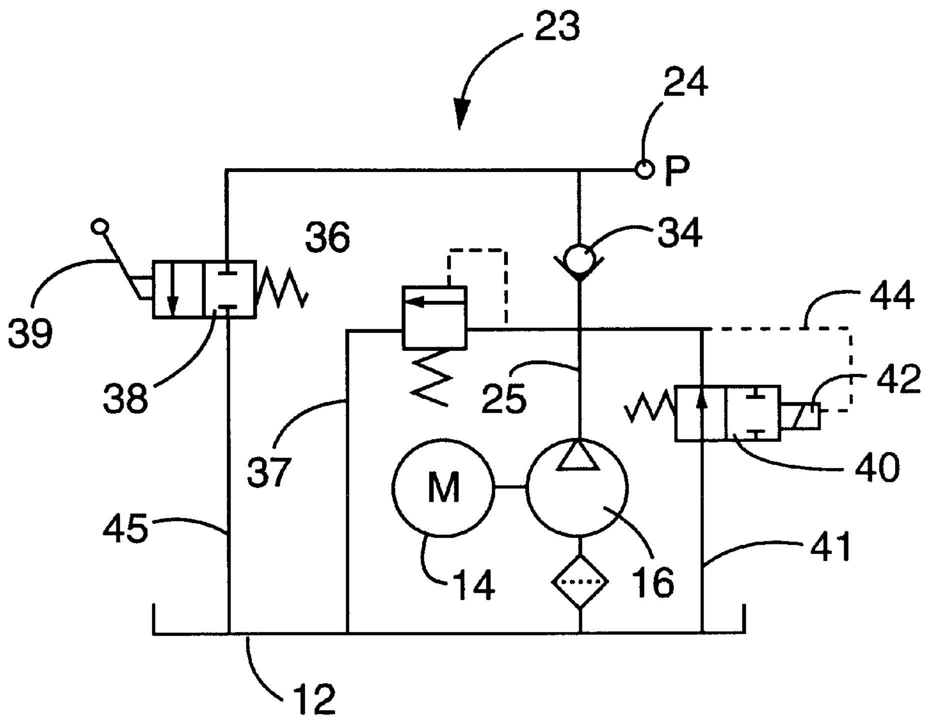
FIG. 5 is a schematic showing an electronically controlled load delay.
Figure 6:
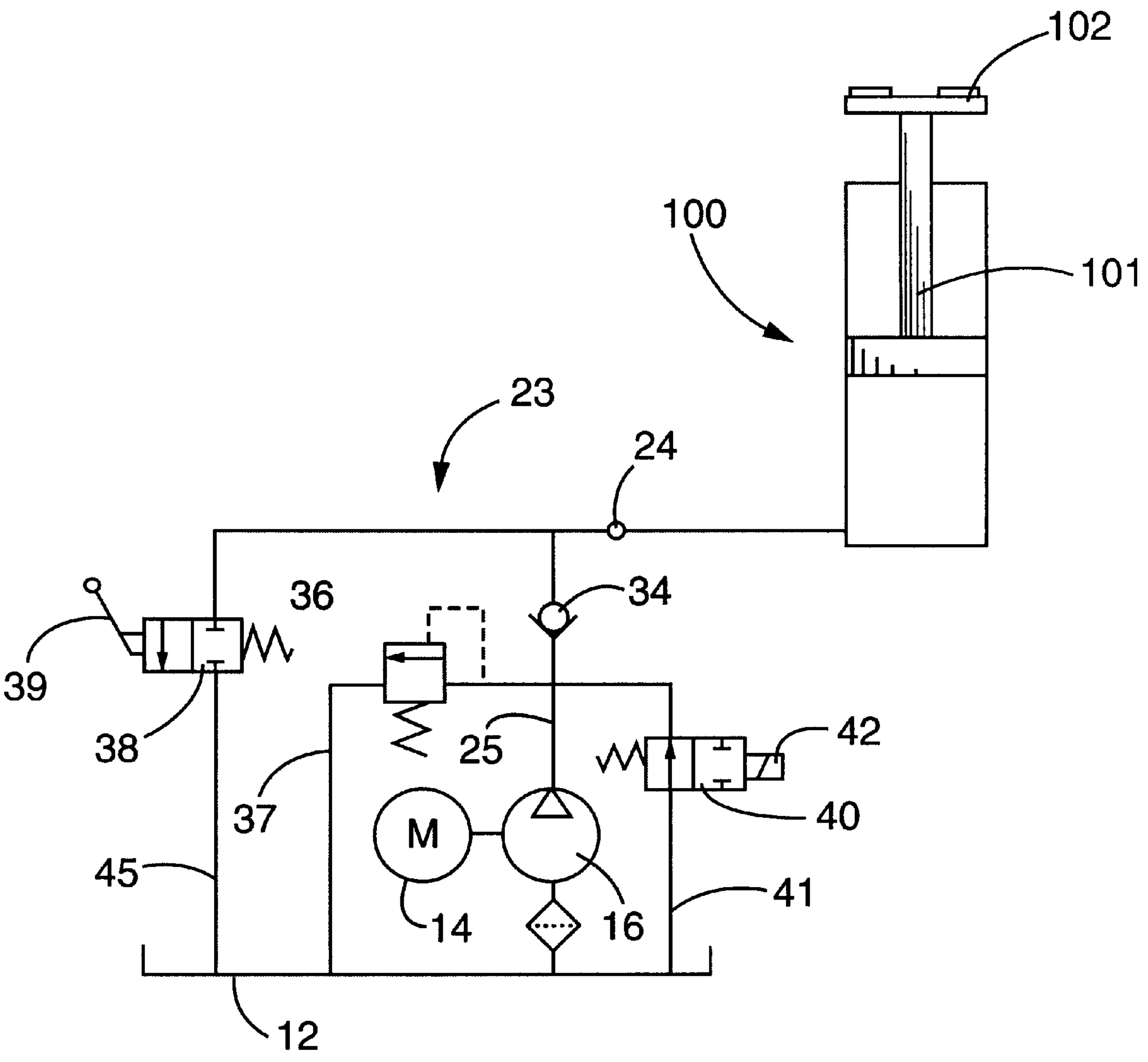
FIG. 6 is a schematic illustrating the hydraulic power unit of FIG. 4 installed in a hydraulic hoist system.

In the embodiment illustrated in FIG. 4, the delay valve has an electric timer 42 which may be set at a pre-determined delay period for closing the valve. The delay valve 40 may also be mechanically controlled using a flow sensor 44 as illustrated in FIG. 5. In the mechanically controlled embodiment, the delay valve 40 will close after sensing a pre-determined amount of hydraulic fluid. In both the electric and mechanical embodiments, the delay valve preferably remains open for roughly 500–750 milliseconds for most applications. Other applications may, however, require different delay periods.

It will be appreciated that the hydraulic circuit with delay valve 40 reduces the motor start torque capacity required by the auto-hoist lift. Since the delay valve 40 is open at the time of start-up, the load on the motor is reduced. The delay valve 40 is set so that it closes once the motor and pump near a normal operating speed and are therefore operating at optimum efficiency. Accordingly, the motor need not be oversized to accommodate a full load during the less efficient start-up period.

In addition to reducing the start-up torque requirement, the load delay circuit further makes the power unit 10 more compact. By incorporating the delay valve 40 in the manifold block 22 as noted above, the size of the motor 14 required to drive the pump 16 is reduced. For example, a 1 ton capacity lift will reduce the motor frame size from 56 to 48.

A significant feature of the present invention is the use of a solid state switch 60 to shut off the auxiliary windings once the motor 14 nears operating speed. In conventional power units, the motor has a centrifugal spring which cuts off the auxiliary windings once the motor reaches a certain speed. As noted above, however, the loading of the centrifugal spring is affected by the medium in which the motor is placed. The present invention avoids this problem by using a solid state switch 60 to control the auxiliary windings. The switch 60 is sealed from the reservoir 12 and shuts off the auxiliary windings at the appropriate time. It will therefore be appreciated that the solid state switch 60 provides more accurate control of the auxiliary windings in that the performance of the switch is not affected by hydraulic fluid.

It will be appreciated that the above-mentioned load delay 40 and solid state switch 60 are typically used in hydraulic power units using a single phase motor. Three phase motors, on the other hand, typically do not have auxiliary windings and therefore do not require the solid state switch for controlling such windings. Furthermore, three phase motors often have start-up characteristics which eliminate the need for the load delay. Accordingly, the solid state switch 60 and load delay 40 of the present invention are used primarily with single phase motors.

From the above, it will be appreciated that the present invention provides a new and improved power unit for an auto-hoist lift which is more compact and generates less noise. The motor and pump driving the power unit is located inside a reservoir submerged under the hydraulic fluid. As a result, much of the noise generated by the motor and pump is retained inside the power unit. In addition, hydraulic fluid is pulled through the motor to thereby directly cool the interior of the motor.

Furthermore, the power unit incorporates a load delay circuit for reducing the power requirements during start up conditions. The load delay circuit incorporates a delay valve which is normally open during start up and provides a path for hydraulic fluid to cycle immediately back to the reservoir during start up. After a pre-determined amount of time, the delay valve shuts, thereby delivering hydraulic fluid to the auto-hoist lift. The use of the load delay allows the motor to reach a normal operating speed before encountering the full hydraulic load, thereby reducing the start-up torque requirement of the motor.

What is claimed is:

1. A hydraulic power unit for an auto-hoist lift, the power unit comprising:

a reservoir for holding hydraulic fluid, the reservoir having a closed end and an open end;

a manifold block attached to the open end of the reservoir having an inlet port an outlet pressure port for connection to the auto-hoist lift and a return line for connecting the outlet pressure port to the reservoir, the manifold block carrying a hydraulic circuit located between the ports for controlling the hydraulic fluid delivered by the power unit;

a pump driven by an AC motor, the motor and pump located inside the reservoir and submerged in the hydraulic fluid, the pump drawing hydraulic fluid through the motor before delivering the fluid to the lift, the pump having a pump output fluidically connected through the inlet port to the outlet pressure port:

a return valve manually actuated by a handle, the return valve located in the return line for selectively venting the outlet pressure port to the reservoir;

a check valve disposed between the pump output and the pressure output port for ensuring one directional flow from the pump to the pressure output port; and a pressure relief safety valve connected in fluid parallel with the sump for connecting the pump output to the reservoir at a predetermined pressure.

2. The power unit of claim 1 further comprising a solid state switch connected to the motor.

3. A compact, low-noise hydraulic power unit for an auto-hoist lift, the power unit comprising:

a reservoir for holding hydraulic fluid, the reservoir having a closed end and an open end;

a manifold block attached to the open end of the reservoir having an inlet port and an outlet port, the manifold block carrying a hydraulic circuit including a check valve for preventing hydraulic fluid delivered to the outlet port from flowing back toward the inlet port, a normally closed safety valve with a pressure sensor which automatically opens when the hydraulic fluid reaches an upper pressure limit, and a return valve for returning hydraulic fluid to the reservoir for controlling the hydraulic fluid delivered by the power unit;

a motor supported inside the reservoir; and a pump attached to and driven by the AC motor, the pump and motor being submerged in the hydraulic fluid, the pump drawing hydraulic fluid through the motor before delivering the fluid to the lift;

wherein the manifold block also carries a delay valve controlling access to a bypass line which leads back to the reservoir, the delay valve being piped in parallel with the check valve and safety valve, the delay valve being normally open during start-up for returning hydraulic fluid to the reservoir and having a timing mechanism for closing the delay valve.

4. The power unit of claim 3 in which the timing mechanism for closing the delay valve is an electronic timer.

5. The power unit of claim 4 in which the timer is set to close the valve roughly 500 to 750 milliseconds after start-up.

6. The power unit of claim 3 in which the timing mechanism for closing the delay valve is a mechanical flow sensor.

7. The power unit of claim 3 further comprising a solid state switch connected to the motor.

8. An auto-hoist lift for lifting vehicles, comprising:

a hydraulic cylinder having an input for selective raising and lowering of the vehicles; and means attached to the hydraulic cylinder for supporting and lifting vehicles; and a power unit including:

a reservoir for holding hydraulic fluid, the reservoir having a closed end and an open end;

a manifold block attached to the open end of the reservoir having an inlet port and an outlet pressure port connected to the input of the auto-hoist lift and a return line for connecting the outlet pressure port to the reservoir, the manifold block carrying a hydraulic circuit located between the ports for controlling the hydraulic fluid delivered by the power unit; and a pump driven by an AC motor, the motor and pump located inside the reservoir and submerged in the hydraulic fluid, the pump drawing hydraulic fluid through the motor before delivering the fluid to the lift, the pump having a pump output fluidically connected through the inlet port and outlet pressure port to the hydraulic cylinder.

9. The auto-hoist lift of claim 8, further comprising:

a return valve manually actuated by a handle, the return valve located in the return line for selectively venting the outlet pressure port;

a check valve disposed between the pump output and the pressure output port for ensuring one directional flow from the pump to the pressure output port; and a pressure relief safety valve connected in fluid parallel with the pump for connecting the pump output to the reservoir at a predetermined pressure.

* * * * *